United States Patent [19]

Wiedeck et al.

[11] Patent Number: 5,007,792

[45] Date of Patent: Apr. 16, 1991

[54] VEHICLE-MOUNTED LOAD HOISTING DEVICE

[76] Inventors: Hans Wiedeck, Mendener Strasse 82, D-4430 Mülheim, Fed. Rep. of Germany; Michel Chiesura, Residence les Arcs Rue Moliere, F-42160 Andrezieux Boutheon, France

[21] Appl. No.: 220,672

[22] Filed: Jul. 18, 1988
(Under 37 CFR 1.47)

[30] Foreign Application Priority Data

Jul. 17, 1987 [DE] Fed. Rep. of Germany ....... 3723604

[51] Int. Cl.⁵ ................................................ B60P 1/16
[52] U.S. Cl. .................................. 414/500; 414/494; 414/549
[58] Field of Search ............... 414/494, 498, 500, 546, 414/549, 569, 571

[56] References Cited

U.S. PATENT DOCUMENTS

| 2,848,126 | 8/1958 | Taylor | 414/494 X |
| 4,053,074 | 10/1977 | Lemaire | 414/498 X |

FOREIGN PATENT DOCUMENTS

| 1430217 | 3/1969 | Fed. Rep. of Germany | 414/494 |
| 2325866 | 12/1973 | Fed. Rep. of Germany | . |
| 2508436 | 11/1975 | Fed. Rep. of Germany | . |
| 2806406 | 9/1979 | Fed. Rep. of Germany | . |
| 3136956 | 4/1982 | Fed. Rep. of Germany | . |
| 3141769 | 8/1982 | Fed. Rep. of Germany | . |
| 3312557 | 10/1984 | Fed. Rep. of Germany | 414/498 |
| 3445222 | 7/1985 | Fed. Rep. of Germany | . |
| 8620144 | 7/1986 | Fed. Rep. of Germany | . |
| 2231601 | 12/1974 | France | 414/498 |
| 2540804 | 8/1984 | France | 414/498 |
| 1194732 | 11/1985 | U.S.S.R. | 414/494 |
| 2152479 | 8/1985 | United Kingdom | 414/498 |

Primary Examiner—David A. Bucci
Assistant Examiner—John VandenBosche
Attorney, Agent, or Firm—Spencer & Frank

[57] ABSTRACT

A vehicle-mounted load hoisting device includes a pivot frame mounted on the vehicle for pivotal motion about a first horizontal axis extending transversely to the vehicle length; a cantilever arm connected to the pivot frame for pivotal motion about a second horizontal axis extending parallel to the first axis; a pivot arm articulated to the cantilever arm for pivotal motion about a third axis oriented parallel to the first and second axes; a pulley mounted at an end of the pivot arm for supporting a cable or the like wound on a winch and attachable to the load; and an arrangement for locking the cantilever arm and the pivot frame together to form a rigid unit pivotal about the first axis. When forming the rigid unit, the cantilever arm is in contact with a stop face on the pivot frame and extends as a longitudinally aligned continuation of the cantilever arm.

17 Claims, 6 Drawing Sheets

VEHICLE-MOUNTED LOAD HOISTING DEVICE

BACKGROUND OF THE INVENTION

The present invention relates to a device for loading and unloading a load from a vehicle having a pivot frame mounted at one end of the vehicle so as to be pivotal about a horizontal axis oriented perpendicularly to the direction of vehicle length. A cantilever arm is pivotally connected to the other end of the pivot frame for pivotal motion about an axis parallel to the horizontal axis. The cantilever arm is angled upwardly from the vehicle (when viewed in the loaded position) and is swingable by a power device (such as hydraulic power cylinders) to a position where the cantilever arm engages an abutment of the pivot frame.

Such a device is known and is disclosed in German Offenlegungsschrift (non-examined published application) 2,325,866. This prior art device includes a hook at the free end of an angled cantilever arm, which engages the load and, by pivoting the cantilever arm over the rear end of the vehicle, can set down or hoist the load. Although the prior art device has favorable lever ratios which reduce the load acting on the hydraulic power cylinders, it is suitable only for the manipulation of certain large, box-like containers which can be emptied in a manner similar to that of a sliding dump truck body.

SUMMARY OF THE INVENTION

It is an object of the present invention to provide a loading and unloading device of the above-mentioned type with which differently shaped loads, such as containers, pallets, hutches (troughs) and also pontoons can be manipulated quickly and reliably without requiring excessive adaptation work.

This object and others to become apparent as the specification progresses, are accomplished by the invention, according to which, briefly stated, the vehicle-mounted load hoisting device includes a pivot frame mounted on the vehicle for pivotal motion about a first horizontal axis extending transversely to the vehicle length; a cantilever arm connected to the pivot frame for pivotal motion about a second horizontal axis extending parallel to the first axis; a pivot arm articulated to the cantilever arm for pivotal motion about a third axis oriented parallel to the first and second axes; a pulley mounted at an end of the pivot arm for supporting a cable or the like wound on a winch and attachable to the load; and an arrangement for locking the cantilever arm and the pivot frame together to form a rigid unit pivotal about the first axis. When forming the rigid unit, the cantilever arm is in contact with a stop face on the pivot frame and extends as a longitudinally aligned continuation of the cantilever arm.

It is an advantage of the invention that the requirement for simplification and greater uniformity in transportation as it is encountered, in particular, in current pioneering equipment, is met to the greatest possible extent. Additionally, the device according to the invention also overcomes the drawbacks encountered in the prior art devices for manipulating pontoons in that, when picking up the pontoon, the lifting cable need not be relocated from an upper engagement zone to a lower engagement zone.

The device of the invention can be employed with any vehicle (including tracked vehicles) that can be equipped with a flat bed and at most requires, for adaptation to different shapes of loads, easily and quickly performed conversion measures.

Additional features according to the present invention make it possible to omit the use of push boats when foldable pontoons are picked up out of the water. When picking-up pontoons (foldable in a W-shape) by prior art devices, the two outer flotation bodies would not fold automatically against the inner flotation bodies but had to be additionally pressed in by push boats. A sudden downward pivoting of the pivot arm, according to the invention, from a raised position simultaneously lowers the attached pontoon. The forces generated when the pontoon impacts on the water are sufficient to press the outer flotation bodies to the inner flotation bodies and simultaneously lock them together.

DESCRIPTION OF THE PREFERRED EMBODIMENT

Figure 1:
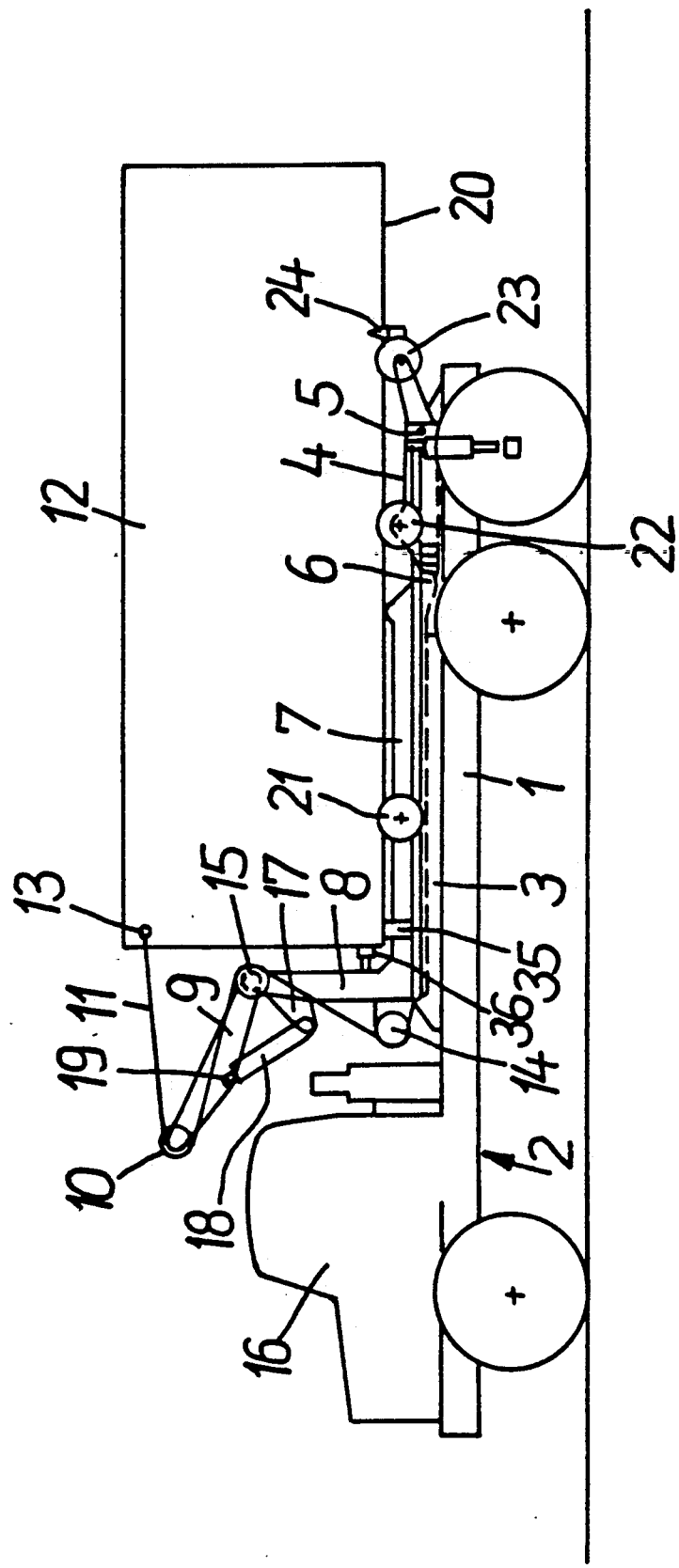
FIG. 1 is a schematic side elevational view of a vehicle equipped with a preferred embodiment of the invention, with a pontoon load placed thereon.

Turning to FIG. 1, a base frame 3 is fastened to the truck bed 1 and a pivot frame 4 is mounted thereon which is pivotal at one end about a horizontal axis 5 which extends transversely to the longitudinal direction of the truck 2 and which is situated at the rear end thereof. A cantilever arm 7 is hinged to the other end of the pivot frame 4 by an axis 6 which is parallel to the axis 5. The cantilever arm 7 has an integral terminal part 8 which is oriented at a right angle to the arm 7 and which, in the illustrated position, extends in an upward direction from the bed 1. A pivot arm 9 is articulated to the free end of the terminal part 8. The pivot frame 4 and the cantilever arm 7 are positioned in the longitudinal direction of the vehicle and, in the illustrated loaded state, lie horizontally and parallel on the base frame 3. At the free end of the pivot arm 9 a roller 10 is provided to guide a hoisting cable 11 connected to an upper location 13 of a load 12 and wound on a winch 14. The cable 11 is guided over a roller 15 which is coaxial with the pivot axis of pivot arm 9. The winch 14 is disposed on the terminal part 8 of the cantilever arm 7 on the side facing away from the load 12, that is, facing away from the axis 6 and thus oriented toward the driver's cab 16 of the vehicle 2. On the same side of the terminal part 8, at a higher level, a projection 17 is provided for supporting a hydraulic cylinder 18. The piston rod of the hydraulic cylinder 18 engages the pivot arm 9 at fulcrum 19.

The load 12 is guided on both sides along its lower outer edges 20 by three pairs of rollers 21, 22 and 23, each provided with wheel flanges on their exterior faces. The rollers of each pair are coaxial. Two centering cones 24 are rotatably mounted to the rear end of the vehicle 2 so as to engage the two lower edges 20 of the load 12 and prevent it from running off to the sides.

Figure 2:
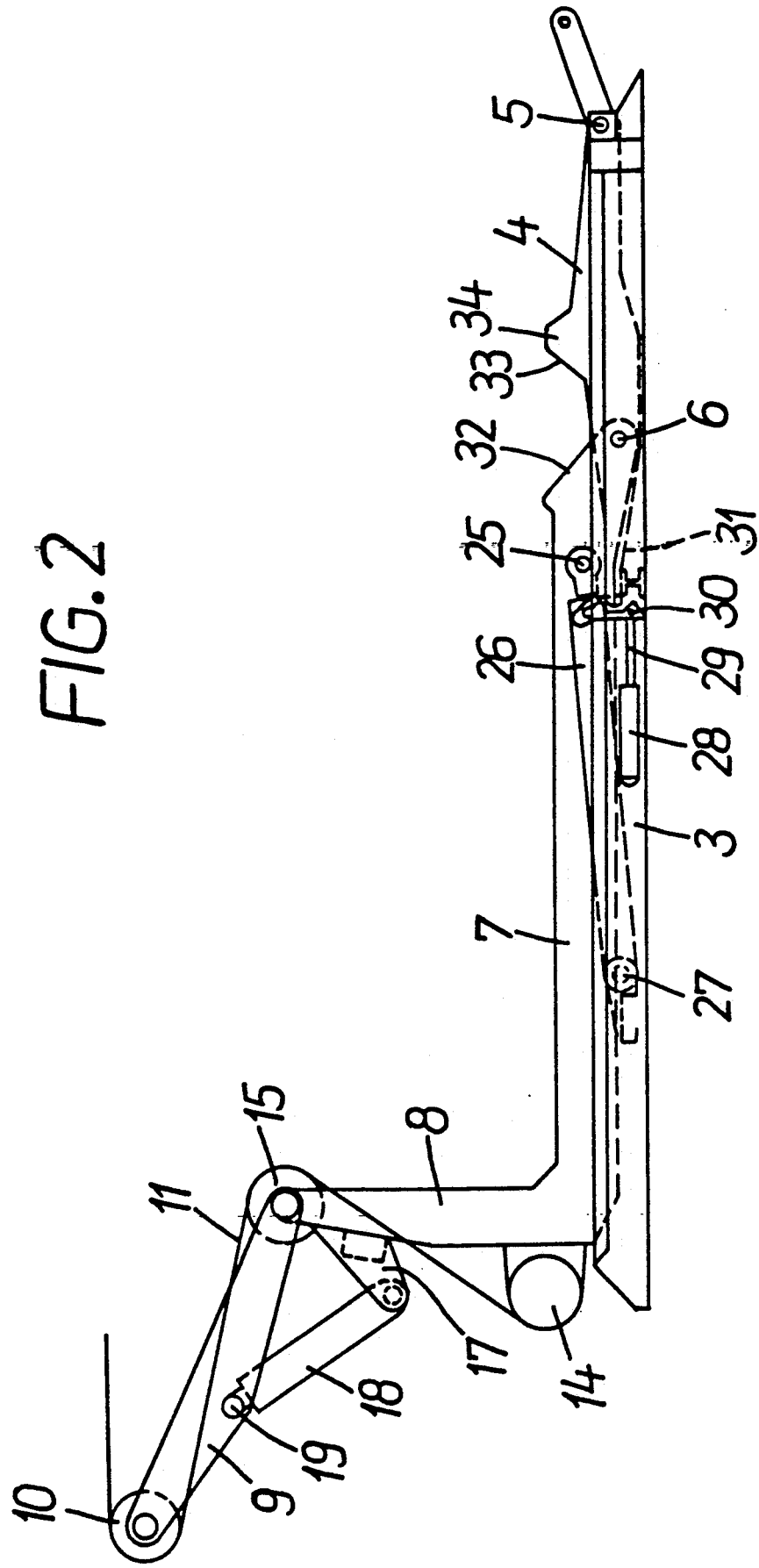
FIG. 2 is a schematic side elevational view of the preferred embodiment, removed from the vehicle and drawn on an enlarged scale.

Turning now to FIG. 2 in which rollers 21, 22 and 23 have been omitted for the sake of clarity, the piston rods of two hydraulic cylinders 26 (only one is visible) are articulated to the cantilever arm 7 at an axis 25 which is spaced at a predetermined distance from and above the axis 6 where the cantilever arm 7 is pivoted to the pivot frame 4. The other ends of the piston rods are mounted at an axis 27 to the base frame 3. A pneumatic cylinder 28 is disposed on the cantilever arm 7 in the longitudinal direction of vehicle 2, with its piston rod 29 engaging a hook 30 which passes around a catch 31 which forms an extension of the pivot frame 4 beyond axis 6, in order to lock the pivot frame 4 to cantilever arm 7. In the locked state, the pivot frame 4 and the cantilever arm 7 are in a mutually flush position and form a rigid unit pivotal about axis 5 by hydraulic cylinders 26. In the unlocked state, the cantilever arm 7 is able to initially pivot about axis 6 until its frontal face 32 abuts a counterface 33 of a stop cam 34 forming part of the pivot frame 4. In the loading position, faces 32 and 33 are disposed approximately at a right angle to one another so that the cantilever arm 7 may pivot approximately 90°.

Figure 3:
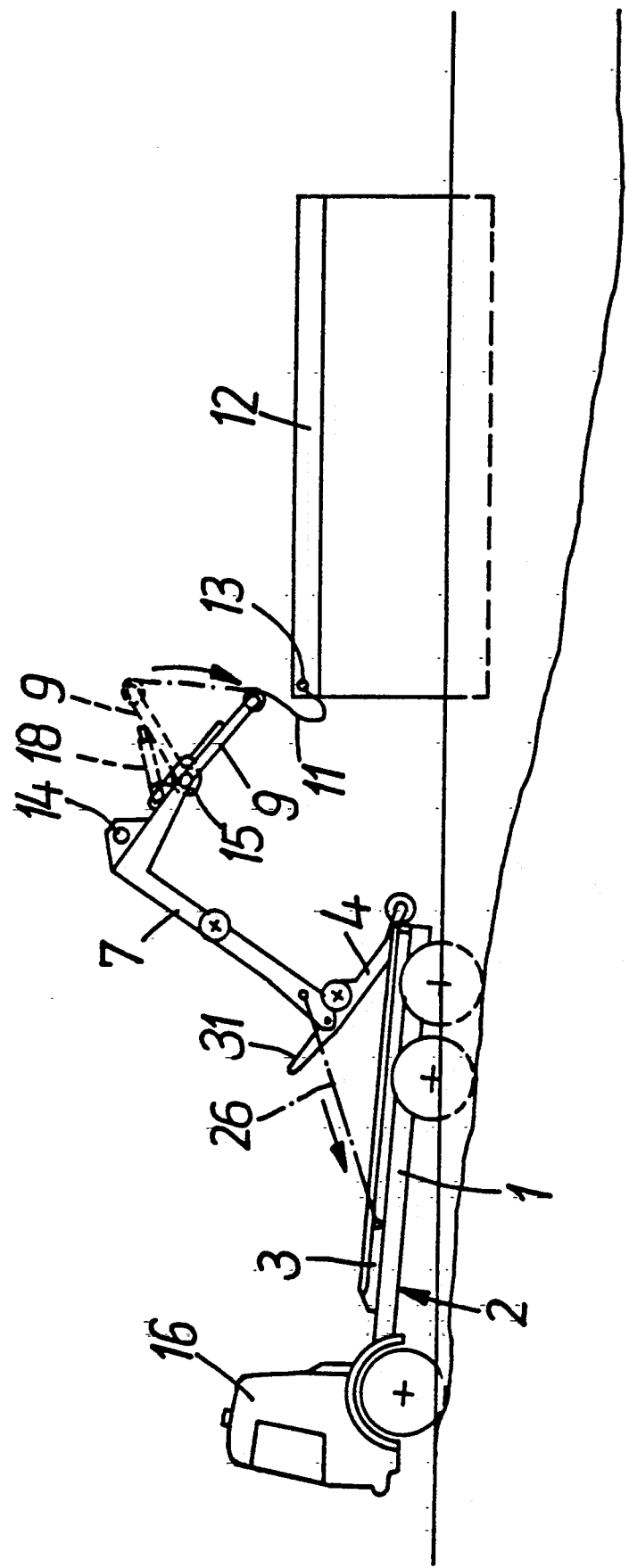
FIG. 3 is a schematic side elevational view of a vehicle equipped with the preferred embodiment, shown in the position before the pontoon is hoisted from the water.
Figure 4:
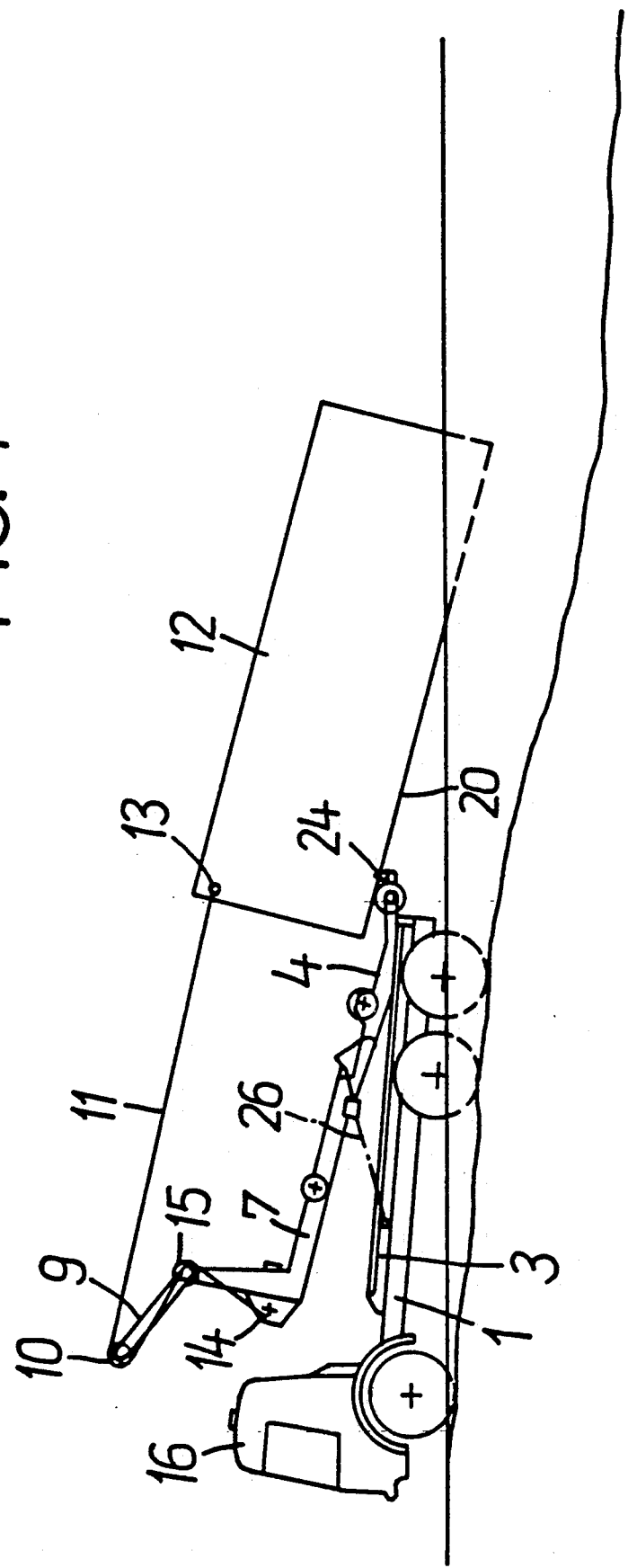
FIG. 4 is a view similar to FIG. 3, showing the vehicle during the hoisting of the pontoon.

FIGS. 3 and 4 show the launching and hoisting of a pontoon 12, constituting a load. To launch (setting down) the pontoon 12, the cantilever arm 7 is lifted in its state locked to the pivot frame 4 as shown in FIG. 4. Rollers 21, 22 and 23 aid in the unloading of the pontoon as it is put into the water, and the cable 11 is released from pontoon 12 after it has been unloaded. Also, two bolt pin-type locks 35 (one visible in FIG. 1) which serves to prevent lateral displacement of the pontoon 12 during transportation, are released before launching. Then, in a known manner, pontoon 12 rocks over the end of the vehicle which itself may have been driven partially into the water, as may be observed in FIGS. 3 and 4. The pontoon 12 then unfolds automatically.

For hoisting the pontoon 12 from the water, cable 11 is attached at the point of attachment 13, which is disposed at the frontal portion of the pontoon at the lower end in the plane of symmetry and the pontoon is lifted by the pivotal arm 9 which forms a continuation of the cantilever arm 7. During this occurrence the two inner or center flotation bodies of pontoon 12 thus come to contact one another and are automatically locked to one another. Pontoon 12 is then lifted out of the water by pivoting pivot arm 9 into its end position shown by the dashed lines in FIG. 3, which is also visible in FIGS. 1 and 2, and is lowered suddenly due to a sudden depressurization of the hydraulic cylinder 18. This causes the inner sides of the outer flotation bodies of the pontoon to suddenly impact on the surface of the water, thus bringing the outer flotation bodies in contact with the already juxtaposed inner flotation bodies and automatically locking them at the same time. Then by the actuation of the winch 14 and the hydraulic cylinders 26 the pontoon 12 is again raised and pulled up over the rear end of vehicle 2, as shown in FIG. 4. Thus, the pontoon 12 can be pulled onto the vehicle without putting it down and without changing the position of the cable 11.

While the pontoon 12 is being lifted out of the water, cantilever arm 7 is raised by hydraulic cylinders 26 to an angled, unlocked position with respect to the likewise raised pivot frame 4. The free end of the cantilever arm 7 projects beyond the end of vehicle 2 as shown in FIG. 3.

Figure 6:
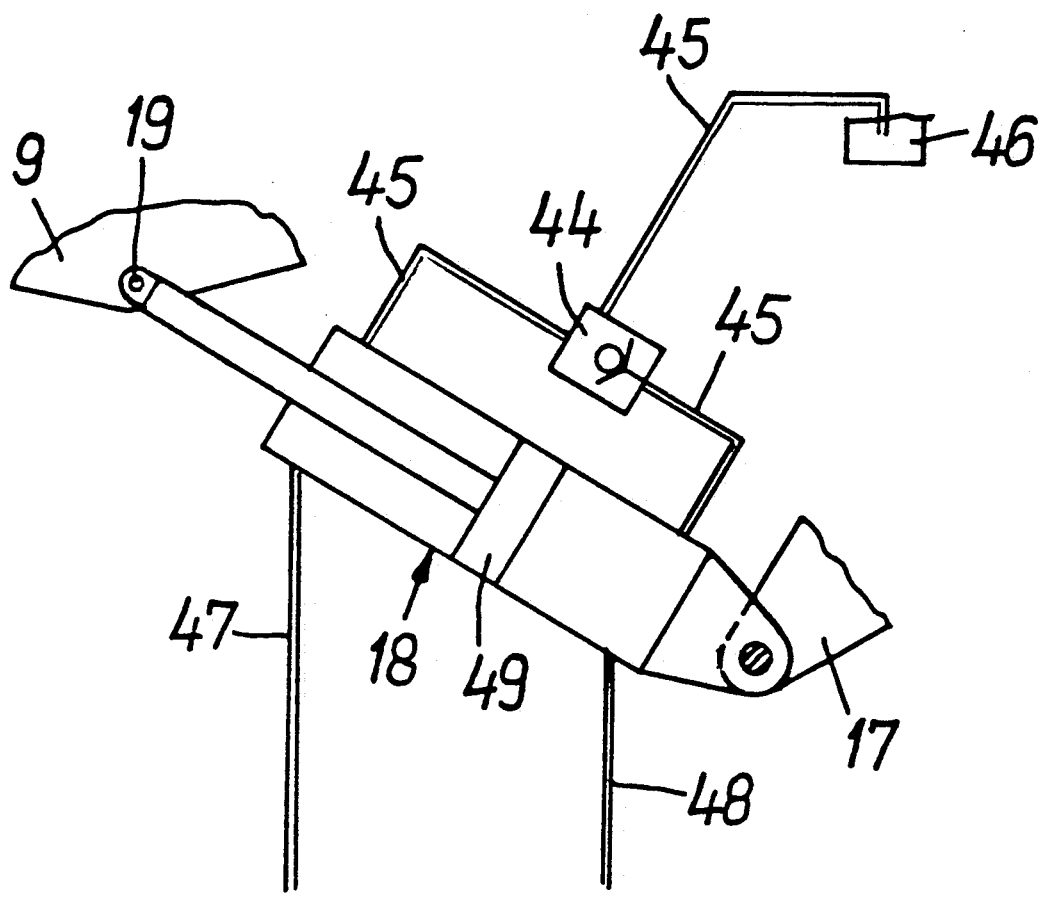
FIG. 6 is a schematic illustration of a hydraulic circuit associated with the power cylinder shown in FIG. 1.

The sudden downward pivoting of pivot arm 9 from the raised position shown in FIG. 3 can be effected by means of a suitable hydraulic circuit as shown in FIG. 6. For this purpose, it is expedient to provide an appropriately dimensioned shutoff valve 44, with the circumvention of the valve block (not shown), directly in a large-sized suction conduit 45 connected to a pressurized fluid reservoir 46 and to both ends of the hydraulic cylinder 18. The double acting hydraulic cylinder 18 is as usual at both of its ends further provided with actuating conduits 47 and 48 which are connected to the valve block. If the conduit 47 is set under pressure for lifting purposes, the shutoff valve 44 is closed. For sudden downward pivoting of pivot arm 9 the valve 44 becomes opened thus permitting pressure compensation on both sides of the piston 49 of hydraulic cylinder 18.

In the pulled-up loaded state, as shown in FIG. 1, the frontal face of pontoon 12 facing the driver's cabin 16 lies against end stops 36 (only one shown) and is held in this position by bolt locks 35, and by tying down cable 11 by means of the winch 14.

Figure 5:
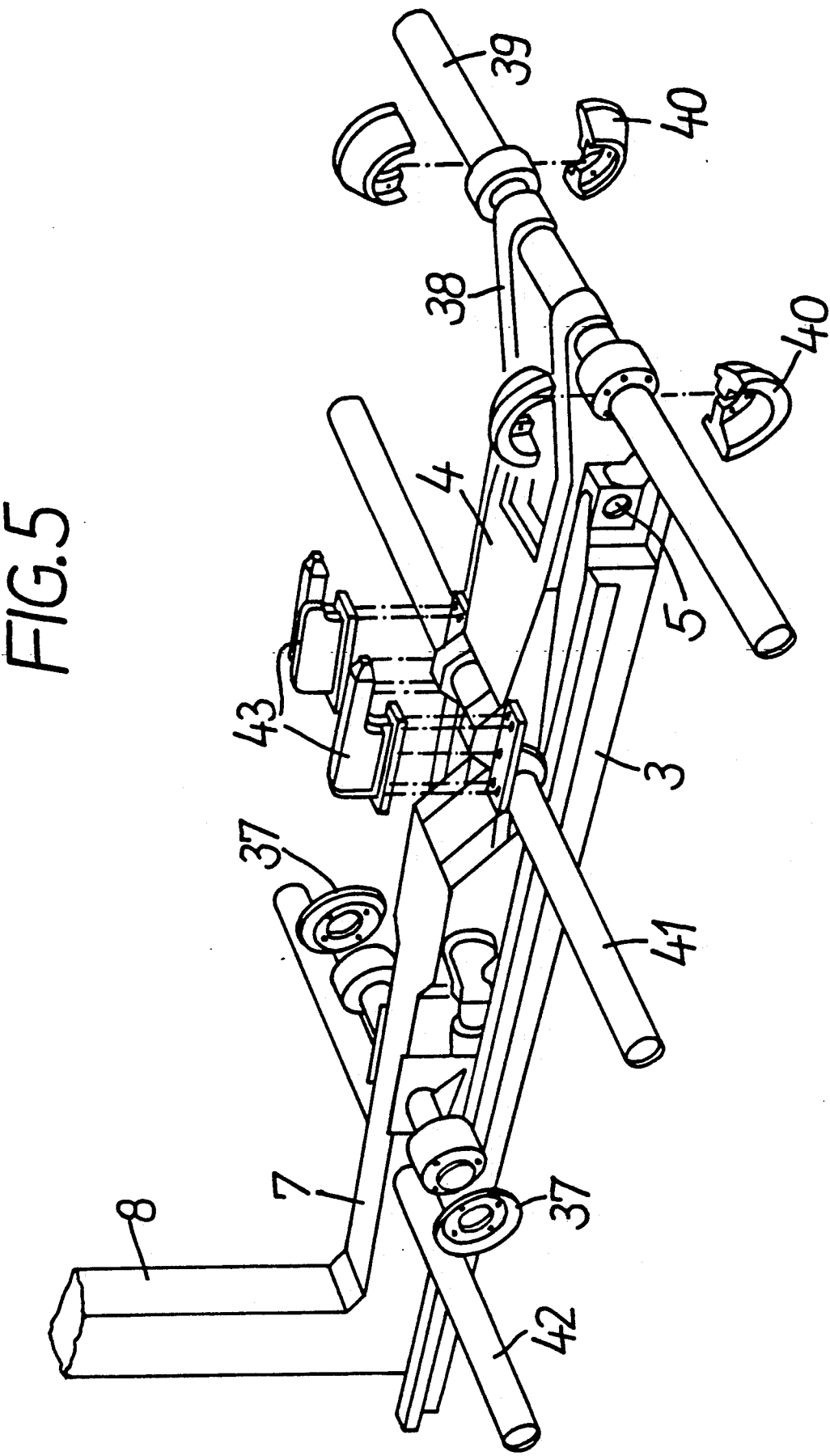
FIG. 5 is a schematic perspective view of a portion of the preferred embodiment, including components for performing conversion measures for the manipulation of various containers.

FIG. 5 is a schematic representation illustrating the conversion of the device to accommodate standard containers according to ISO or DIN standards which are provided with two parallel longitudinal tracks along their undersides. For this purpose, a front guide wheel 37 is disposed on each side of cantilever arm 7, while a fork-like projection 38 is disposed at the rear end of the pivot frame 4. The projection is equipped with a tubular axle 39 which extends from both sides of projection 38 with respect to the base frame 3. A pair of rear guide wheels 40 can be placed on to axle 39. The axle 39 and two further axles 41 and 42 which are parallel to axle 39 are equipped with the guide rollers 23, 22 and 21 at their ends for hoisting a pontoon 12, as shown in FIG. 1. These guide rollers are removed during conversion. Two catch hooks 43 are provided at axle 41 in the region of the rails of the standard container. These hooks must be removed when transporting a pontoon or they may be folded down to such an extent that they no longer project over the loading plane.

Figure 7:
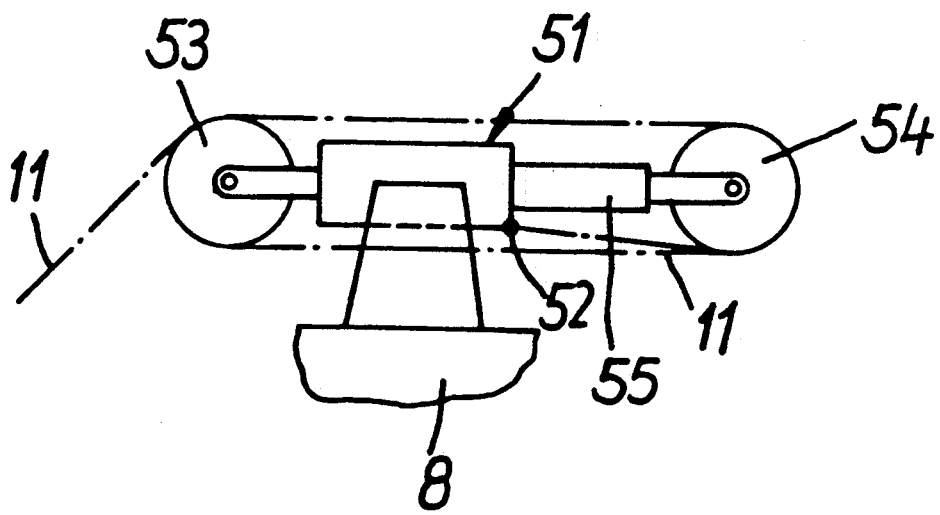
FIG. 7 is a schematic side elevational view of a tackle block device serving as a winch for the hoisting cable shown in FIG. 1.

FIG. 7 shows a tackle block device which can be used instead of the winch 14. This device comprises a hydraulic cylinder unit 51 connected to the terminal part 8 of the cantilever arm 7. The hoisting cable 11 is connected to a fixed point 52 at the piston side of the cylinder 51 and guided over two blocks 53 and 54 journalling parallel to each other at opposite ends of the hydraulic cylinder unit 51. Each of the blocks 53 and 54 comprises for instance five coaxial pulleys thus causing the hoisting cable 11 to move with a speed which is ten times the speed of the extending piston rod 55 of the hydraulic cylinder unit 51.

The present disclosure relates to the subject matter disclosed in Federal Republic of Germany Application No. P 37 23 604.0 filed July 17th, 1987, the entire specification of which is incorporated herein by reference.

It will be understood that the above description of the present invention is susceptible to various modifications, changes and adaptations, and the same are intended to be comprehended within the meaning and range of equivalents of the appended claims.

What is claimed is:

1. In a vehicle-mounted load hoisting device for loading and unloading a load from a vehicle, including
a pivot frame having first and second ends; said pivot frame being mounted on the vehicle at said first end for pivotal motion about a first axis extending horizontally and transversely to a longitudinal direction of the vehicle;
a stop face provided on said pivot frame;
a cantilever arm having first and second ends; said cantilever arm being connected at the first end thereof to the second end of said pivot frame for pivotal motion relative to said pivot frame about a second axis extending spaced from and parallel to said first axis;
a power means supported on the vehicle and being articulated to said cantilever arm for pivoting said cantilever arm about said second axis into contact with said stop face;
the improvement comprising
(a) a pivot arm having first and second ends; said pivot arm being articulated at the first end thereof to the second end of said cantilever arm for pivotal motion relative to said cantilever arm about a third axis oriented parallel to said first and second axes and being spaced therefrom;
(b) a pulley mounted at the second end of said pivot arm;
(c) a winch;
(d) an elongated, flexible hoisting means wound on the winch and trained about said pulley and being adapted to extend from said pulley for attachment to the load;
(e) locking means for locking said cantilever arm and said pivot frame together to form a rigid unit pivotal about said first axis; in said rigid unit said cantilever arm being in contact with said stop face and extending as a longitudinally aligned continuation of said cantilever arm; and
(f) a pair of catch hooks for standard pallets and standard containers; said catch hooks are pivotal out of the way.

2. A vehicle-mounted load hoisting device for loading and unloading a load from a vehicle, comprising
(a) a pivot frame having first and second ends; said pivot frame being mounted on the vehicle at said first end for pivotal motion about a first axis extending horizontally and transversely to a longitudinal direction of the vehicle;
(b) a stop face provided on said pivot frame;
(c) a cantilever arm having first and second ends; said cantilever arm being connected at the first end thereof to the second end of said pivot frame for pivotal motion relative to said pivot frame about a second axis extending spaced from and parallel to said first axis; said cantilever arm having a transporting position in which it is oriented generally horizontally for supporting the load located on the vehicle; and further wherein said cantilever arm having a terminal length portion, including said second end of said cantilever arm; said terminal length portion extending generally vertically upwardly when said cantilever arm is in its said transporting position;
(d) a power means supported on the vehicle and being articulated to said cantilever arm for pivoting said cantilever arm about said second axis into contact with said stop face;
(e) a pivot arm having first and second ends; said pivot arm being articulated at the first end thereof to the second end of said cantilever arm for pivotal motion relative to said cantilever arm about a third axis oriented parallel to said first and second axes and being spaced therefrom;
(f) a pulley mounted at the second end of said pivot arm;
(g) a winch being attached to said terminal length portion and being oriented in a direction away from said second axis;
(h) an elongated, flexible hoisting means wound on the winch and trained about said pulley and being adapted to extend from said pulley for attachment to the load;
(i) an additional pulley mounted at said second end of said cantilever arm coaxilly with said third axis; said elongated, flexible hoisting means being guided by said additional pulley to said pulley mounted at the second end of said pivot arm; and
(j) locking means for locking said cantilever arm and said pivot frame together to form a rigid unit pivotal about said first axis; in said rigid unit said cantilever arm being in contact with said stop face and extending as a longitudinally aligned continuation of said cantilever arm.

3. A device as defined in claim 2, further comprising a pair of catch hooks for standard pallets and standard containers; said catch hooks are removable.

4. A device as defined in claim 2, further comprising two centering cones rotatably mounted on the pivot frame for rollingly engaging two lower edges of the load.

5. A device as defined in claim 2, wherein the vehicle is a truck equipped with a flat bed and said lifting means is a hydraulic lifting assembly, said load being loaded and unloaded from a rear end of said truck.

6. A device as defined in claim 2, wherein the pivotal range of said pivot arm is at least from 0° to 30° and at the most from 0° to 120°.

7. A device as defined in claim 6, wherein the pivotal range of said pivot arm is at least from 0° to 45° and at the most from 0° to 90°.

8. A vehicle-mounted load hoisting device for loading and unloading a load from a vehicle, comprising
(a) a pivot frame having first and second ends; said pivot frame being mounted on the vehicle at said first end for pivotal motion about a first axis extending horizontally and transversely to a longitudinal direction of the vehicle;
(b) a stop face provided on said pivot frame;
(c) a rigid cantilever arm having a first length portion and a second length portion rigidly affixed to said first length portion whereby the cantilever arm has a substantially L-shaped configuration; said cantilever arm having a first end forming a free terminus of said first length portion and a second end forming a free terminus of said second length portion; said cantilever arm being connected at the first end thereof to the second end of said pivot frame for pivotal motion relative to said pivot frame about a second axis extending spaced from and parallel to said first axis; said cantilever arm having a transporting position in which said first length portion is oriented generally horizontally for supporting the load located on the vehicle and said second length portion extending generally vertically upwardly;

(d) a pivot arm having first and second ends; said pivot arm being articulated at the first end thereof to the second end of said cantilever arm for pivotal motion relative to said cantilever arm about a third axis oriented parallel to said first and second axes and being spaced therefrom;

(e) a first pulley mounted at the second end of said pivot arm; and a second pulley mounted coaxially with said third axis;

(f) a cable winch attached to said cantilever arm;

(g) a cable wound on a cable winch and trained about said first and second pulleys and being adapted to extend from said first pulley for attachment to the load;

(h) locking means for locking said cantilever arm and said pivot frame together to form a rigid unit pivotal about said first axis; in said rigid unit said cantilever arm being in contact with said stop face and extending as a longitudinally aligned continuation of said cantilever arm;

(i) a first power means for operating said locking means;

(j) a second power means supported on the vehicle and being articulated to said cantilever arm for pivoting said cantilever arm about said second axis into contact with said stop face and for pivoting said cantilever arm and said pivot frame as a rigid unit when said locking means has locked said cantilever arm to said pivot frame;

(k) a third power means supported on said cantilever arm and articulated to said pivot arm for rotating said pivot arm about said third axis;

(l) a projection provided on said cantilever arm and extending in a direction away from said second and third axes; said third power means being articulated to and supported by said projection; and (m) load-engaging rollers mounted on said pivot frame and said cantilever arm for rollingly supporting the load in the transporting position of said cantilever arm.

9. A device as defined in claim 8, wherein said third power means comprises a hydraulic power cylinder.

10. A device as defined in claim 8, wherein said pivot frame has a first length measured perpendicularly to said first axis and said cantilever arm has a second length, excluding said terminal length portion, measured perpendicularly to said second axis; said second length dimension being greater than said first length dimension.

11. A device as defined in claim 8, wherein said load-engaging rollers include wheel flanges arranged to pass around lower outer edges of the load.

12. A device as defined in claim 11, wherein the load-engaging rollers are arranged in pairs; the rollers of each pair being aligned in a direction parallel to said axes.

13. A device as defined in claim 12, further comprising adjusting means for varying the distance between rollers forming the pairs of adapt the rollers to loads of diverse widths.

14. A device as defined in claim 8, wherein said third power means includes means for causing and permitting sudden downward pivoting of said pivot arm.

15. A device as defined in claim 14, wherein said third power means comprises a hydraulic power cylinder, a large-sized suction conduit extending from said power cylinder and a pressurized fluid reservoir directly connectable to said suction conduit.

16. A vehicle-mounted load hoisting device as defined in claim 8, wherein said winch is mounted on said cantilever arm.

17. A vehicle-mounted load hoisting device as defined in claim 16, wherein said winch is mounted on said second length portion of said cantilever arm.

* * * * *